(No Model.) 2 Sheets—Sheet 1.
J. C. KEOUGH.
FEEDING MECHANISM FOR SEWING MACHINES.
No. 564,887. Patented July 28, 1896.
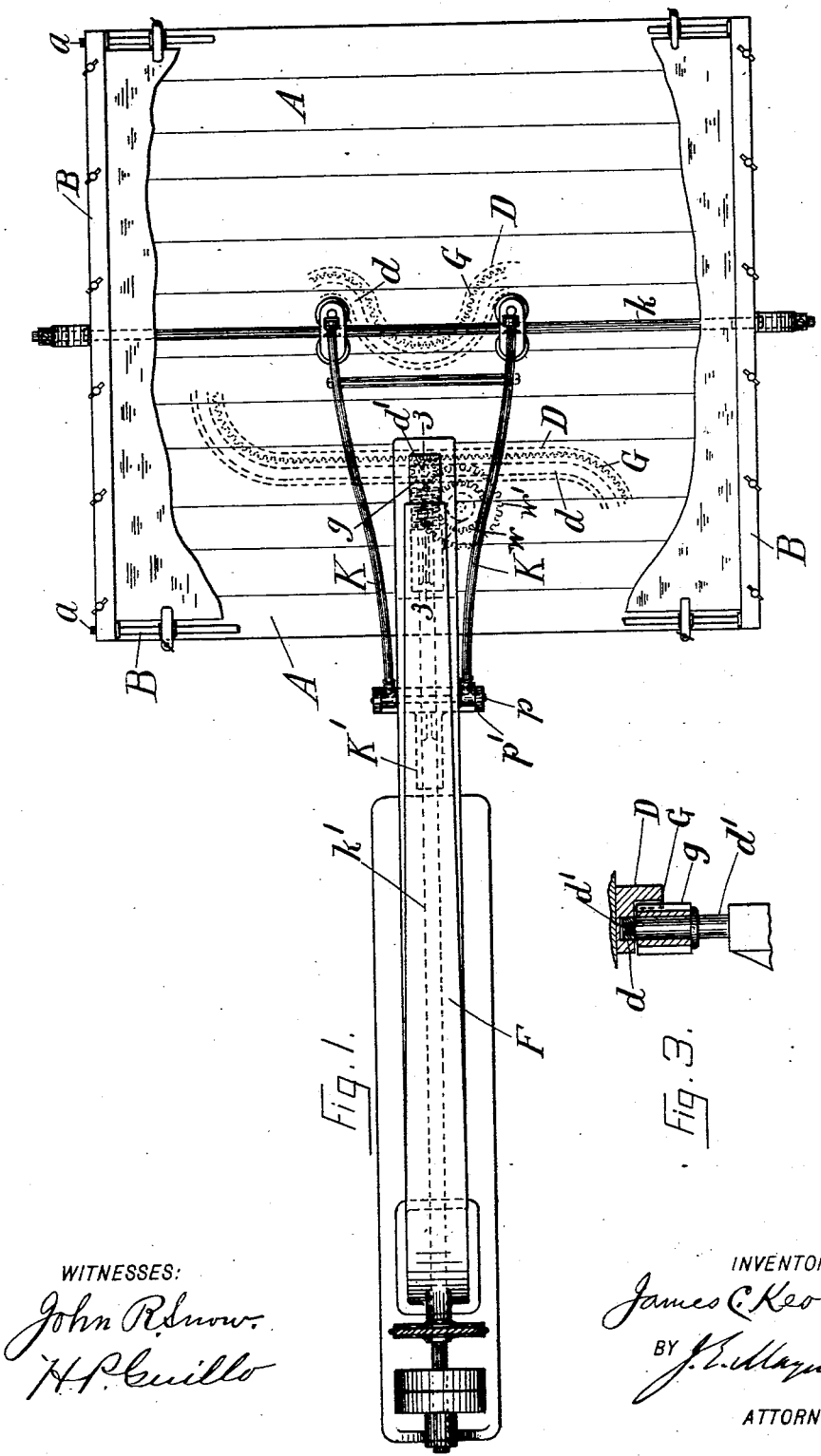
WITNESSES:
John R. Snow
H. P. Cuillo
INVENTOR
James C. Keough
BY J. R. Maynadier
ATTORNEY.

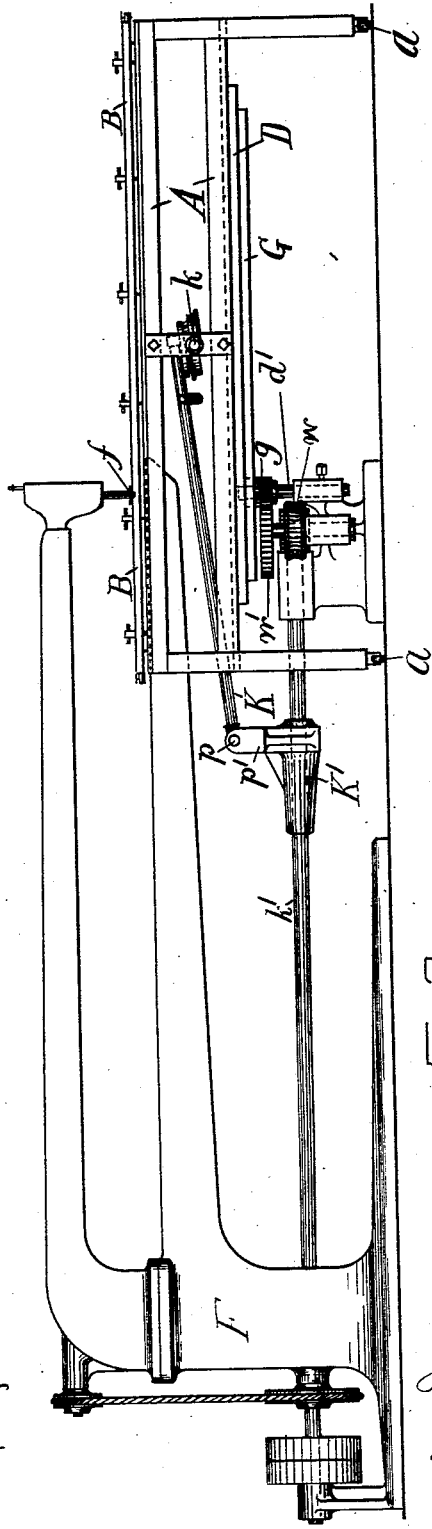

UNITED STATES PATENT OFFICE.

JAMES C. KEOUGH, OF HOLYOKE, MASSACHUSETTS.

FEEDING MECHANISM FOR SEWING-MACHINES.

SPECIFICATION forming part of Letters Patent No. 564,887, dated July 28, 1896.

Application filed April 17, 1895. Serial No. 546,023. (No model.)

*To all whom it may concern:*

Be it known that I, JAMES C. KEOUGH, of Holyoke, in the county of Hampden and State of Massachusetts, have invented a new and useful Feed Mechanism, of which the following is a specification, reference being had to the accompanying drawings, in which—

Figure 1 is a plan, and Fig. 2 an elevation, of a sewing-machine with my feed mechanism. Fig. 3 is a vertical section on line 3 3 of Fig. 1.

My invention is the combination of a carriage mounted on casters and free to move in any direction on a floor, a pattern-plate fast to the carriage and provided with a pattern-groove and with a rack parallel with that groove, a stud and a pinion, the pinion engaging with the rack and the stud projecting into the pattern-groove, the pinion actuating the carriage through the rack and the stud and pattern-groove guiding the table, and restraining mechanism consisting of two rods relatively at right angles and a traveler on each rod, one of the rods being secured to the floor and the other to the carriage, and the travelers being connected together to form a restraining mechanism which serves to prevent the carriage from revolving about the stud as an axis when the carriage is moved by the pinion engaging with the rack.

In a universal feed mechanism composed of a single carriage A on four casters $a$, on which a work-holder B is carried, and which also carries a pattern-plate D, the pattern in which is a groove $d$ to receive a stud $d'$, the stud $d'$ and machine F being stationary relatively to each other, the carriage A can be moved about on its casters so as to compel the pattern-groove $d$ to move over the stud $d'$; that is, the work in the holder B will be properly guided to the tool $f$ of the machine by the pattern-groove and stud.

In a sewing-machine the motion of the carriage A should be substantially uniform, and, moreover, its tendency to motion about stud $d'$ as an axis must be restrained, in order to make stitches of substantially uniform length.

In the drawings I have shown my universal feed mechanism as applied to a quilting-machine.

The carriage A carries a pattern-plate D, having a pattern-groove $d$. Parallel with the pattern-groove $d$ and following its sinuosities is a rack G, with which meshes a pinion $g$, driven by a worm-gear $w$ through gear $w'$, fast to the shaft of worm-gear $w$. Stud $d'$ enters the pattern-groove $d$ in pattern-plate D. The rods $k\ k'$ are arranged at right angles to one another, and the travelers K K' move upon the rods $k\ k'$, respectively, the travelers K K' being connected by a strut.

In the quilting-machine shown in the drawings the rod $k'$ serves also as a shaft, through which motion is imparted by a worm to worm-gear $w$, and by the gear $w'$, fast to the shaft of worm-gear $w$, to the pinion $g$, which meshes with the rack G. I have shown the traveler K' as a sleeve on rod $k'$ and the traveler K as composed of a frame and four wheels, connected by a pin $p$ to a projection $p'$, fast to the sleeve which constitutes traveler K'; but these are mere details of construction, desirable in certain cases only.

Universal feed mechanisms consisting of a lower carriage, means to confine it to a movement in one line, an upper carriage, means to confine it to a movement on the lower carriage in a line across the line of movement of the lower carriage, and a pattern-groove and its stud controlling the upper carriage are old, examples being shown in Patents No. 185,954, dated January 2, 1877; No. 308,981, dated December 9, 1884, and No. 334,275, dated January 12, 1886, all granted to F. L. Palmer; but by my invention I dispense with the lower carriage, also with the means to confine it to a movement in one line, and also with the means to confine the upper carriage to a movement in one line; that is to say, speaking strictly, I dispense with the lower carriage, the track on which it travels in one line, and the track carried by the lower carriage and substitute casters for the wheels of the upper carriage, while, speaking with less strictness, but more practically, I discard both carriages and both tracks of the patents above mentioned.

Another example of a universal feed mechanism consisting of a carriage, means to confine it to a movement in one line, a second carriage, means to confine it to a movement in a line crosswise of the line of movement of the first, and a pattern-groove and its stud controlling the movements of both carriages is shown in Patents No. 358,124, dated February 22, 1887, and No. 448,253, dated March 17, 1891, both granted to F. L. Palmer; but as to these patents I dispense, strictly speaking, with one of the two carriages and with both of the tracks and substitute casters for the wheels of the other carriage, or, practically speaking, I discard both carriages and both tracks of Patents No. 358,124 and No. 448,253.

I am also aware of the Patents No. 438,138, to Beck, dated October 14, 1890, and No. 540,348, to Bartlett, dated June 4, 1895, and disclaim all shown in them, for none of the patents referred to in this specification shows the combination of a single carriage which can be moved just as a piece of furniture on casters can be moved about a room, with a pattern-groove and stud, and a pattern-rack and pinion and restraining mechanism.

What I claim is—

In combination a carriage mounted on casters; a pattern-plate provided with a pattern-groove and rack carried by the carriage; a stud engaging the pattern-groove; a pinion held in mesh with the rack by the stud and groove; means for actuating the pinion; and restraining mechanism consisting of a guide-rod, a traveler on that rod, a second guide-rod at right angles with the first rod and a second traveler on the second rod, and connected to the first traveler, all organized to actuate and guide the carriage automatically and prevent it from moving on the stud as an axis as it is moved on the floor by the pinion and rack.

JAMES C. KEOUGH.

Witnesses:
EDWARD F. NUGENT,
GEORGE H. ALLYN.